Nov. 12, 1929.   A. OBICI   1,735,471

PEANUT BRANDING MACHINE

Filed Oct. 16, 1928   2 Sheets-Sheet 1

Inventor

Amedeo Obici

By Mason Fenwick Lawrence

Attorneys

Nov. 12, 1929.  A. OBICI  1,735,471
PEANUT BRANDING MACHINE
Filed Oct. 16, 1928  2 Sheets-Sheet 2
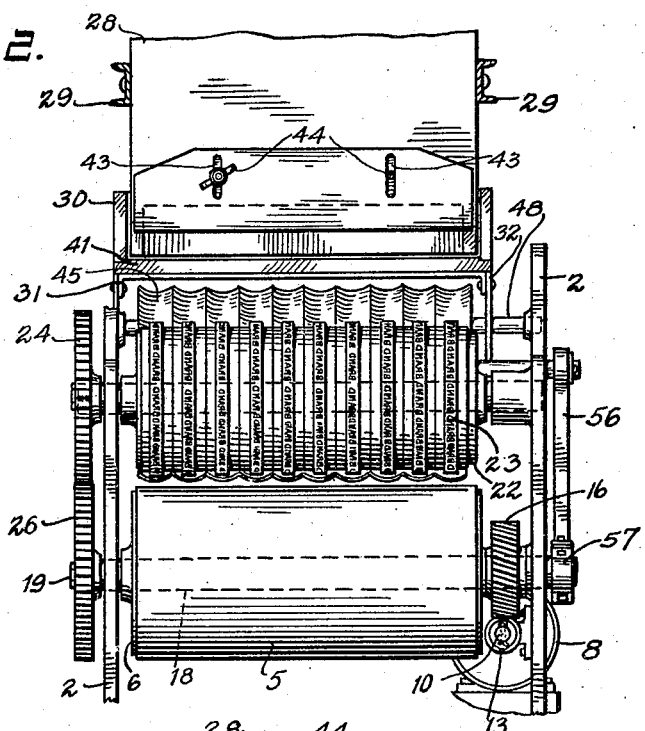
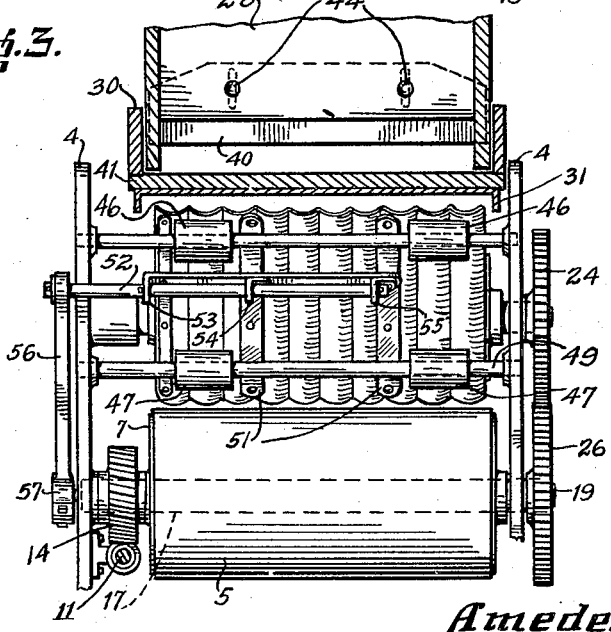
Inventor
Amedeo Obici
By Mason Fenwick Lawrence
Attorneys Patented Nov. 12, 1929

1,735,471

UNITED STATES PATENT OFFICE

AMEDEO OBICI, OF DRIVERS, VIRGINIA

PEANUT-BRANDING MACHINE

Application filed October 16, 1928. Serial No. 312,905.

This invention relates to machines for printing a brand or trademark on fragile irregular shaped articles, such as peanuts in the shell.

The main object of the invention is to provide a machine of this class which will stamp a legible mark or brand on the rough and irregular shape of a peanut hull.

A further object of the invention is to provide a machine which will not only stamp a legible mark or brand on the peanut shell but will do so without breaking the hull.

A further object of the invention is also to provide a device to feed peanuts in the shell to the marking part of the apparatus rapidly and without breaking the shells.

Other objects of the invention will appear as the detailed description thereof proceeds.

In the drawings:

Figure 2 is a front elevation of the apparatus;

Figure 3 is a vertical section taken on the line 3—3 of Figure 1;

Figure 1:
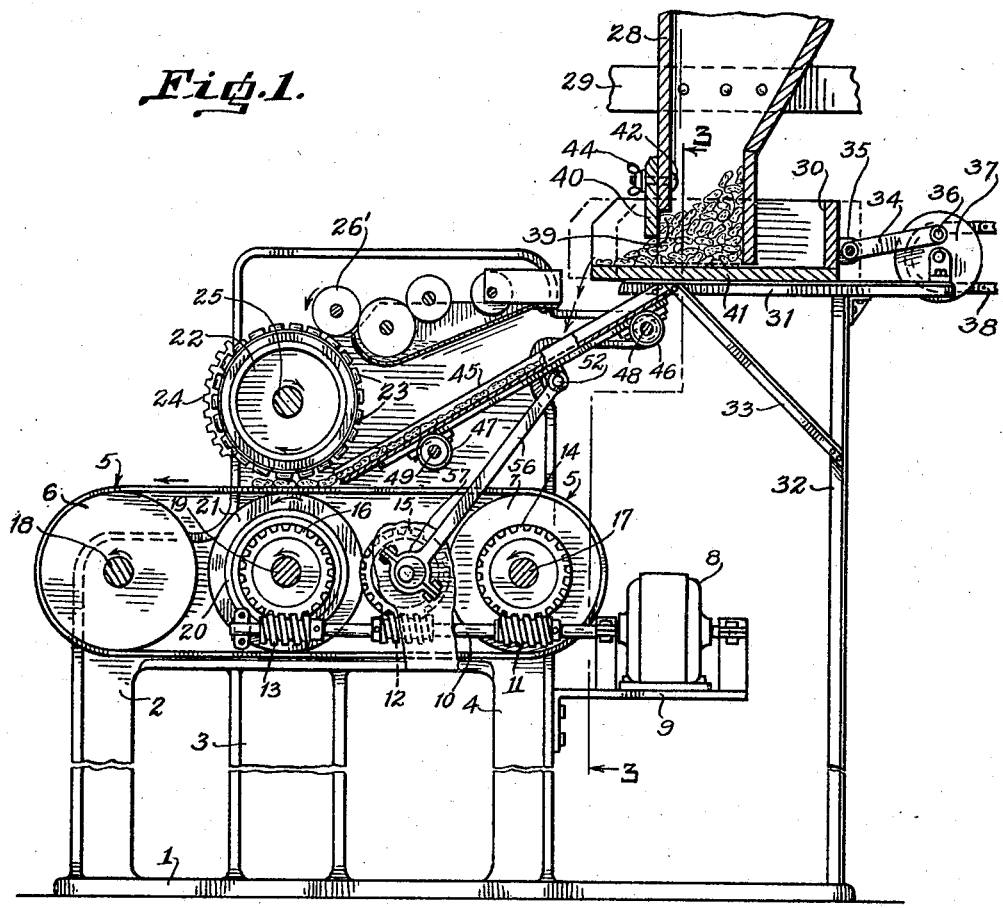
Figure 1 is a side elevation of the invention; parts thereof being shown in section to illustrate principles of operation thereof.
Figure 4:
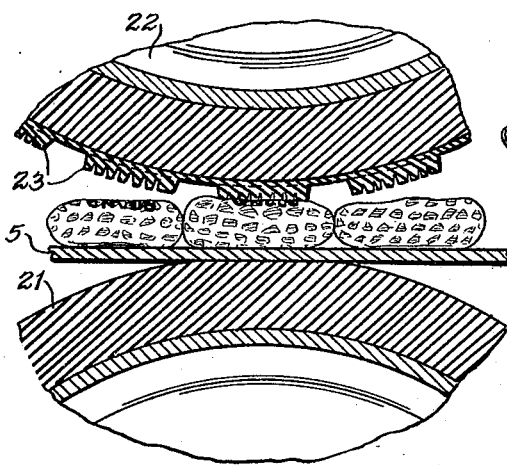
Figure 4 is a fragmentary vertical section through the branding roller which forms part of the invention.
Figure 5:
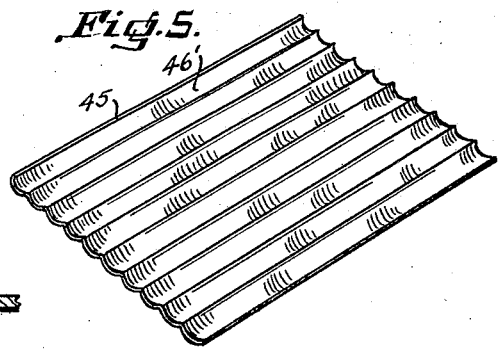
Figure 5 is a perspective view of a corrugated plate for alining and feeding peanuts to the marking or branding part of the apparatus.

As shown in the drawings, the invention comprises a supporting base 1 having standards 2, 3 and 4 rising therefrom to support the operating mechanism of this invention.

Upon the framework supported by the standards 2, 3, and 4 a conveyer device is movably mounted. This conveyer comprises a belt 5 of soft flexible material, mounted as an endless conveyer rotatably over the rollers 6 and 7 which are rotatably mounted in suitable bearings in the framework of the machine.

A suitably supported motor 8 is mounted fixedly on the bracket 9 secured to the rear of standard 4. This motor 8 has a shaft 10 extending horizontally therefrom, and this shaft 10 is provided at properly spaced intervals thereon with worms 11, 12 and 13 in mesh with worm gears 14, 15 and 16, respectively.

The gear 14 is fixed on the shaft 17 which carries the roller 7 and imparts rotation through the belt 5 to the idler roller 6 which is rotatably mounted in the framework by means of the shaft 18. Between the shafts 17 and 18, a third shaft 19 is rotatably mounted in the framework parallel to the shafts 17 and 18. The shaft 19 has the worm gear 16 fixed thereto and is rotated thereby. The shaft 19 also carries a steel drum 20 having a cylindrical roller of soft rubber fixed to its periphery, and the diameter of the cylindrical rubber roller 21 is equal to the diameter of the conveyer rollers 6 and 7.

In the conveyor construction just described, it will be evident that the soft rubber roller 21 forms a support for the soft conveyer belt 5 in the stretch thereof between the conveyer rollers 6 and 7. This rubber roller 21 is intended to support the peanuts at a point on the belt 5 directly under a printing wheel 22, which is similar in every respect to the roller 21, except that it has strips 23 of soft rubber type cemented to the cushion rubber on the periphery of the wheel 22. The wheel 22 is driven directly from the roller 21 by means of a gear 24, fixed to the ends of the shaft 25 carrying the printing wheel or roller 22, and meshing with the gear 26 fixed to the end of shaft 19, opposite to the gear 16.

The supporting and printing rollers are so spaced apart that the center line of the average sized peanut passes through the point of contact of the pitched circles of the two gears and the two rollers are driven in opposite direction to feed the peanuts between them at the same rate as the belt 5 of the conveyer travels.

An inking roller 26', rotatably mounted in the framework to contact with the upper strips 23, is supplied with ink or other marking material by any conventional device such as that designated generally by the reference numeral 27. Any suitable type of inking mechanism may be used as the specific details of this mechanism form no part of the present invention.

The peanuts to be branded are fed to the device from a hopper 28 suitably fixed to framework 29 which is also fixed relative to the base 1. The hopper 28 has its lower end open and extending into a box 30, the front end of which is removed. The box 30 is slidably mounted on a table 31 carried by a standard 32 and bracket 33, which are suitably fixed to the floor supporting the base 1.

The box 30 is reciprocated on the table 31 by means of a link 34, pivotally connected at one end to a lug 35 on the rear of box 30 and connected at its other end to a pivot 36 eccentrically mounted on a disk 37 which is driven by a chain and sprocket mechanism 38.

The front of the lower end of the hopper 28 is cut away to form an opening 39 which may be closed by means of a sliding door 40 adapted to be locked in adjusted position relative to the bottom 41 of box 30 by means of the bolts 42, which are secured to the front wall of the hopper and extend through slots 43 in door 40. Thumb nuts 44 screwthreaded on the end of the bolts 42 are adapted to clamp the door 40 in adjusted position on the front wall of the hopper 28.

A corrugated guide plate 45 has its upper end arranged below the front end of the table 31 and has its lower end disposed closely adjacent to the belt 5 near the point where the peanuts must engage with the printing roller. The corrugations 46' on the plate 45 are of such width as to arrange the peanuts lengthwise therein when the plate 45 is suitably agitated.

The plate 45 is slidably supported by rollers 46 and 47 fixed to shafts 48 and 49, respectively, rotatably mounted in the fixed framework of the machine. Brackets 51, secured to the back of plate 45, straddle the shafts 48 and 49, to permit a limited reciprocation of the plate 45 on the rollers 46 and 47.

To reciprocate plate 45 on rollers 46 and 47, the back of the plate 45 has a rod 52 secured thereto by brackets 53, 54 and 55, and has its end projecting laterally from the framework pivotally connected to one end of a link 56 which has its other end pivoted by the strap connection shown in Fig. 1 to the disk 57, eccentrically keyed or otherwise secured to the shaft 58 rotated by worm gear 15.

In operation, the peanuts or similar shaped articles are disposed in bulk in the hopper 28 and the door 40 is adjusted to control the quantity of peanuts projected through the opening 39 at each backward throw of box 30. As will be apparent from Fig. 1, when the trough-like box 30 moves forward under the hopper 28 some of the peanuts slide out with it and in front of the hopper and others fall down behind them to replace the void. As the box 30 moves back, the peanuts are held in place by the back of the hopper, and those which were previously moved in front of the hopper are forced off the front end of the bottom 41 and fall onto the reciprocating agitator plate 45.

The agitation of plate 45 causes the peanuts to form in rows in the corrugations of plate 45, and with the long axes of the peanuts in substantial alinement in each row. The plate 46 discharges the peanuts on the soft belt 5 closely adjacent to the point of contact of the roller 21 with the belt. The peanuts are then moved directly under the marking strips on roller 22, and are branded thereby as they pass thereunder to the discharge end of belt 5.

What I claim is:

1. The combination with a hopper having the bottom end thereof open, a trough slidable under said end, means for reciprocating said trough to discharge articles from said hopper, a chute having one end thereof positioned under the bottom of said trough, a support, a belt of soft material movable in one direction under the other end of said chute and closely adjacent thereto, a pair of rollers having surfaces of soft material and rotatably mounted on said support and on opposite sides of said belt, one of said rollers being in bearing contact with the under side of said belt, and the other roller being spaced above said belt a sufficient distance to make yielding contact with articles fed thereunder by said belt, and means on the last named roller to mark the articles passed thereunder.

2. A support, a pair of rollers spaced apart and rotatably mounted on said support, an endless belt mounted on said rollers and movable horizontally and rectilinearly by rotation of said rollers, a belt supporting roller having a cylindrical periphery of soft material in supporting contact with the under side of the upper stretch of said belt, a printing roller rotatably mounted on said support immediately over said belt and supporting roller, and means for feeding articles in rows onto said belt and under said printing roller.

3. A support, a hopper fixed thereon and having an open bottom, a trough slidable under said open bottom, the front end of said hopper being provided with a recess immediately above the bottom of said trough, a door slidable vertically on the recessed end of said hopper toward and from the bottom of said trough, means for securing said door in vertically adjusted position relative to said bottom, a belt conveyor mounted on said support laterally of and below said trough, a pair of printing rollers rotatably mounted on opposite sides of said conveyor and on said support, a chute extending from the bottom of said trough to the top of said conveyor and closely adjacent to the space between said rollers, and means for reciprocating said chute to cause discharge of articles therefrom onto said conveyor belt.

In testimony whereof I affix my signature.

AMEDEO OBICI.